United States Patent
Shiiba et al.

(10) Patent No.: US 9,169,413 B2
(45) Date of Patent: Oct. 27, 2015

(54) INK, INK CARTRIDGE AND INK JET RECORDING METHOD

(71) Applicant: CANON KABUSHIKI KAISHA, Tokyo (JP)

(72) Inventors: Kenichi Shiiba, Warabi (JP); Daiji Okamura, Tokyo (JP); Kousuke Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 13/860,927

(22) Filed: Apr. 11, 2013

(65) Prior Publication Data

US 2013/0300803 A1    Nov. 14, 2013

(30) Foreign Application Priority Data

May 9, 2012 (JP) .................. 2012-107780

(51) Int. Cl.

| | | |
|---|---|---|
| *B41J 2/01* | (2006.01) | |
| *B41J 2/05* | (2006.01) | |
| *B41J 2/17* | (2006.01) | |
| *B41J 2/175* | (2006.01) | |
| *B60C 1/00* | (2006.01) | |
| *C08G 18/08* | (2006.01) | |
| *C08G 18/28* | (2006.01) | |
| *C08G 18/80* | (2006.01) | |
| *C08G 73/10* | (2006.01) | |
| *C08K 3/04* | (2006.01) | |
| *C08K 3/20* | (2006.01) | |
| *C08K 5/05* | (2006.01) | |
| *C08K 5/34* | (2006.01) | |
| *C08K 5/3435* | (2006.01) | |
| *C08K 5/3492* | (2006.01) | |
| *C08L 75/00* | (2006.01) | |
| *C09D 5/00* | (2006.01) | |
| *C09D 11/00* | (2014.01) | |
| *G01D 11/00* | (2006.01) | |
| *C09D 11/322* | (2014.01) | |
| *C09D 175/04* | (2006.01) | |
| *C09D 11/30* | (2014.01) | |
| *C09D 7/12* | (2006.01) | |
| *C09D 7/02* | (2006.01) | |
| *C09D 5/02* | (2006.01) | |
| *C09D 175/08* | (2006.01) | |
| *C09D 7/00* | (2006.01) | |
| *C09D 11/324* | (2014.01) | |
| *C09D 175/00* | (2006.01) | |
| *C09D 11/40* | (2014.01) | |
| *C09D 11/38* | (2014.01) | |

(52) U.S. Cl.
CPC ............... *C09D 11/322* (2013.01); *B41J 2/01* (2013.01); *B41J 2/05* (2013.01); *B41J 2/17* (2013.01); *B41J 2/175* (2013.01); *B41J 2/17503* (2013.01); *C09D 5/00* (2013.01); *C09D 5/022* (2013.01); *C09D 5/028* (2013.01); *C09D 7/007* (2013.01); *C09D 7/02* (2013.01); *C09D 7/1225* (2013.01); *C09D 7/1233* (2013.01); *C09D 11/00* (2013.01); *C09D 11/30* (2013.01); *C09D 11/324* (2013.01); *C09D 11/38* (2013.01); *C09D 11/40* (2013.01); *C09D 175/00* (2013.01); *C09D 175/04* (2013.01); *C09D 175/08* (2013.01)

(58) Field of Classification Search
CPC .................. B41J 2/01; B41J 2/05; B41J 2/17; B41J 2/175; B41J 2/17503; C09D 5/00; C09D 5/022; C09D 5/028; C09D 7/007; C09D 7/02; C09D 7/1225; C09D 7/1233; C09D 11/00; C09D 11/30; C09D 11/322; C09D 11/324; C09D 11/40; C09D 175/00; C09D 175/04; C09D 175/08; C09D 11/38
USPC ........ 523/160, 161; 524/86, 98, 99, 100, 104, 524/105, 106, 386, 495, 496, 589, 590, 591, 524/839, 840; 347/1, 56, 86, 95, 100
See application file for complete search history.

(56) References Cited

U.S. PATENT DOCUMENTS

| | | |
|---|---|---|
| 7,144,452 B2 | 12/2006 | Takayama et al. |
| 7,160,372 B2 | 1/2007 | Yoshizawa et al. |
| 7,198,664 B2 | 4/2007 | Mafune et al. |
| 7,198,665 B2 | 4/2007 | Nakamura et al. |
| 7,201,791 B2 | 4/2007 | Okamura et al. |
| 7,247,194 B2 | 7/2007 | Okamura et al. |
| 7,247,196 B2 | 7/2007 | Sato et al. |
| 7,270,701 B2 | 9/2007 | Jinnou et al. |
| 7,297,197 B2 | 11/2007 | Jinnou et al. |
| 7,553,358 B2 | 6/2009 | Okamura et al. |
| 7,566,362 B2 | 7/2009 | Mori et al. |
| 7,611,571 B2 | 11/2009 | Yamashita et al. |
| 7,618,484 B2 | 11/2009 | Fujimoto et al. |
| 7,682,433 B2 | 3/2010 | Yanagimachi et al. |
| 7,699,924 B2 | 4/2010 | Mafune et al. |
| 7,868,060 B2 | 1/2011 | Sakai et al. |
| 8,016,932 B2 | 9/2011 | Okamura et al. |

(Continued)

FOREIGN PATENT DOCUMENTS

| | | | |
|---|---|---|---|
| JP | 2009-515007 A | 4/2009 | |
| JP | 2010-053328 A | 3/2010 | |

(Continued)

*Primary Examiner* — Patrick Niland
(74) *Attorney, Agent, or Firm* — Fitzpatrick, Cella, Harper & Scinto

(57) ABSTRACT

The invention provides an ink containing a self-dispersion pigment in which a phosphonic acid group is bonded directly or through another atomic group to the surface thereof and a polyurethane polymer, wherein the surface charge amount of the self-dispersion pigment is 0.25 mmol/g or more and 0.42 mmol/g or less, and the polyurethane polymer has units respectively derived from a polyisocyanate, a polyether polyol having no acid group and a diol having an acid group.

19 Claims, 2 Drawing Sheets

(56) References Cited

U.S. PATENT DOCUMENTS

| | | |
|---|---|---|
| 8,029,612 B2 | 10/2011 | Ishii et al. |
| 8,123,846 B2 | 2/2012 | Yamakami et al. |
| 8,158,697 B2 | 4/2012 | Kagata et al. |
| 8,785,540 B2 * | 7/2014 | Muller et al. ............... 524/457 |
| 2007/0100024 A1 | 5/2007 | Gu et al. |
| 2012/0035317 A1 * | 2/2012 | Roberts et al. ............... 524/591 |
| 2012/0075381 A1 * | 3/2012 | Wachi ............................ 347/20 |
| 2012/0176441 A1 | 7/2012 | Kagata et al. |

FOREIGN PATENT DOCUMENTS

| | | | |
|---|---|---|---|
| WO | WO 2011/074167 | * | 6/2011 |
| WO | 2012016125 | † | 2/2012 |
| WO | 2012054664 | † | 4/2012 |

\* cited by examiner
† cited by third party

INK, INK CARTRIDGE AND INK JET RECORDING METHOD

BACKGROUND OF THE INVENTION

1. Field of the Invention

The present invention relates to an ink, an ink cartridge having such an ink and an ink jet recording method using the ink.

2. Description of the Related Art

In order to improve the fastness of a resulting image, an ink to which a polyurethane polymer is added has heretofore been investigated (Patent Literature 1: Japanese Patent Application Laid-Open No. 2010-053328). Patent Literature 1 describes an ink containing a polyurethane polymer which contains a polyether polyol as a constituent component. On the other hand, an ink containing a self-dispersion pigment in which a phosphonic acid group is bonded directly or through another atomic group to the surface thereof has been investigated (Patent Literature 2: Japanese Patent Application Laid-Open No. 2009-515007 through PCT route).

As a result of an investigation by the present inventors, it has been found that the ink containing the polyurethane polymer having the polyether polyol as a constituent unit causes a change in the fastness of the resulting image before and after long-term storage. Specifically, when the image was stored for a long period of time, the fastness of the image was lowered. In addition, the fastness of the image obtained with the ink described in Patent Literature 2 was low. Further, when the ink described in Patent Literature 2 was stored for a long period of time, the pigment contained therein aggregated.

SUMMARY OF THE INVENTION

Accordingly, it is an object of the present invention to provide such an ink that a pigment is stably dispersed and the fastness of the resulting image is excellent even when stored for a long period of time. Another object of the present invention is to provide an ink cartridge having the above-described ink according to the present invention and an ink jet recording method using the ink according to the present invention.

The above objects can be achieved by the present invention described below. That is, the ink according to the present invention comprises a self-dispersion pigment in which a phosphonic acid group is bonded directly or through another atomic group to the surface thereof and a polyurethane polymer, wherein the surface charge amount of the self-dispersion pigment is 0.25 mmol/g or more and 0.42 mmol/g or less, and the polyurethane polymer has units respectively derived from a polyisocyanate, a polyether polyol having no acid group and a diol having an acid group.

According to the present invention, there can be provided an ink by which a pigment is stably dispersed and a resulting image is excellent in fastness even when stored for a long period of time. In addition, according to another embodiment of the present invention, there can be provided an ink cartridge and an ink jet recording method using the above-described ink.

Further features of the present invention will become apparent from the following description of exemplary embodiments with reference to the attached drawings.

DESCRIPTION OF THE EMBODIMENTS

Figure 1:
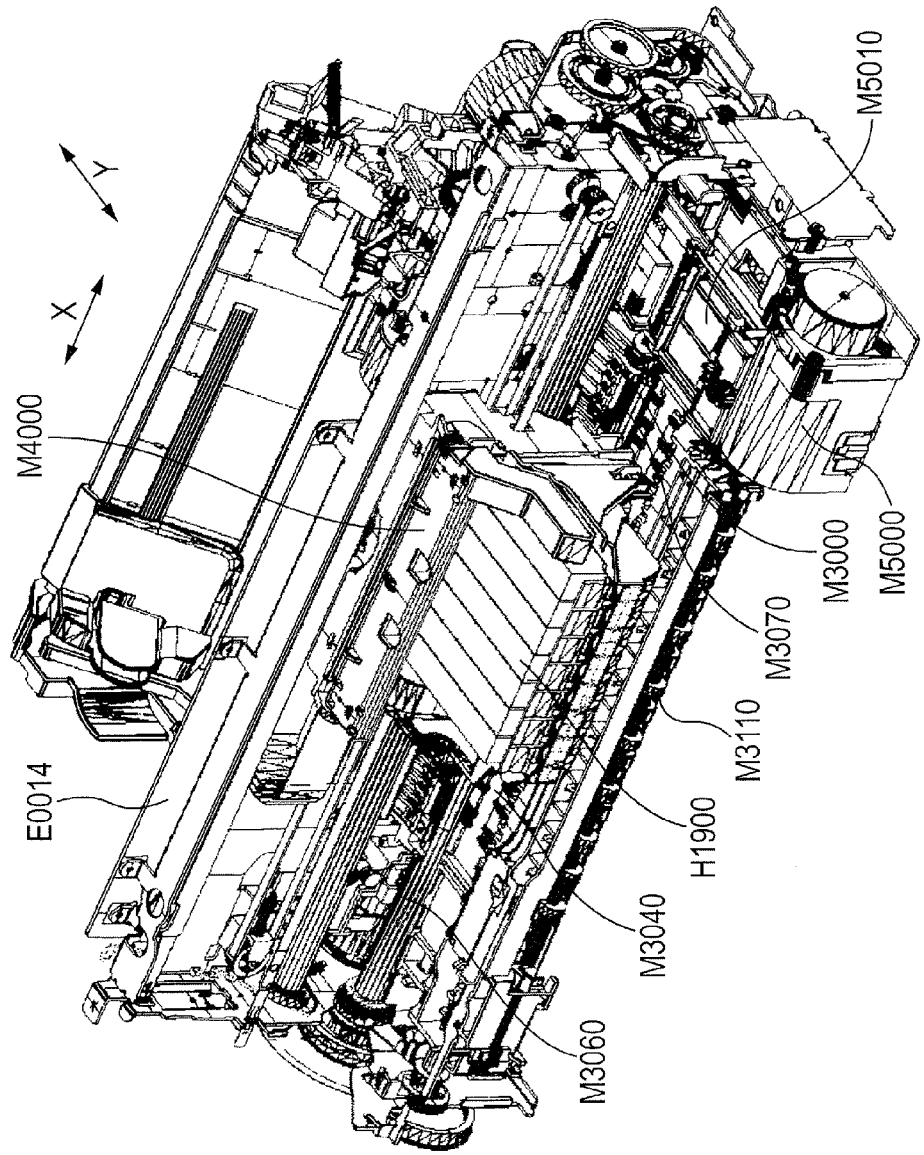
FIG. 1 is a perspective view illustrating a mechanism portion of an ink jet recording apparatus.

Preferred embodiments of the present invention will now be described in detail in accordance with the accompanying drawings.

In general, a polyurethane polymer mainly has two segments of a hard segment composed of a polyisocyanate, a diol having an acid group, a chain extender and the like and a soft segment composed of a polyol having no acid group and the like. The hard segment mainly contributes to strength, and the soft segment mainly contributes to flexibility. Both segments take a microphase separation structure, whereby a polyurethane polymer film can develop high elasticity having strength and flexibility in combination. Such film property closely participates in development of fastness of an image.

The present inventors have carried out an investigation as to various polyurethane polymers. As a result, it has been found that when an ink containing a polyurethane polymer synthesized by using a polyether polyol as a polyol having no acid group is used, an image particularly high in fastness can be provided. The reason for this is described below in detail.

A polyester polyol, polyether polyol, polycarbonate diol or polycaprolactone polyol is generally used as a polyol having no acid group upon synthesis of a polyurethane polymer. Among these, the polyether polyol has particularly high flexibility due to the structure thereof. Accordingly, a polyurethane polymer having a unit derived from the polyether polyol is high in flexibility of a soft segment and is good in balance between strength and flexibility, so that the fastness of an image obtained with the ink containing such a polyurethane polymer is improved.

As described above, it has been found that an image high in fastness can be provided with the ink containing the polyurethane polymer having the unit derived from the polyether polyol. However, an investigation by the present inventors has revealed that when the ink containing such a polyurethane polymer is stored for a long period of time, the fastness of a resulting image is lowered. The present inventors have investigated the reason for this in detail. As a result, it has been found that this is caused by lowering of the molecular weight of the polyurethane polymer due to cleavage of an ether linkage of the unit derived from the polyether polyol constituting the polyurethane polymer caused by dissolved oxygen in the ink, light and/or heat. Specifically, the present inventors consider that the lowering of the molecular weight of the polyurethane polymer is caused by the following reaction mechanism. First, the ether linkage of the unit derived from the polyether polyol constituting the polyurethane polymer is oxidized into a peroxide by dissolved oxygen in the ink. At this time, a metal ion present in the ink exhibits a catalytic action, whereby the oxidation reaction is promoted. Since the peroxide produced by the oxidation reaction of the ether linkage is unstable, it is cleaved by light and/or heat to generate a radical. A decomposition reaction of a surrounding polyurethane polymer is further caused by this radical to generate a new radical. Such a radical-generating reaction is caused in a manner of a chain reaction, whereby the molecular weight of the polyurethane polymer in the ink is lowered.

Thus, the present inventors have carried out various investigations as to a method for inhibiting the lowering of the polyurethane polymer upon long-term storage. As a result, the present inventors have reached the constitution of the present invention that a pigment to be used together with a polyurethane polymer having a unit derived from a polyether polyol is a self-dispersion pigment in which a phosphonic acid group is bonded directly or through another atomic group to the surface thereof, in which the surface charge amount of the pigment is 0.25 mmol/g or more and 0.42 mmol/g or less. The reason for this will now be described in detail.

The self-dispersion pigment exhibits small steric hindrance compared with a polymer-dispersed pigment. Accordingly, when the self-dispersion pigment is contained together with a polyurethane polymer in an ink, a part of the polyurethane polymer can be present in the neighborhood of a pigment particle. In such an ink, the above-described radicals generated by the cleavage of the ether linkage or by the subsequent decomposition reaction react with the surface of the pigment particle, so that the phenomenon that the radical-generating reaction occurs in a manner of a chain reaction is inhibited. In addition, a pigment having a phosphonic acid group among self-dispersion pigments has an excellent effect to inhibit the lowering of the molecular weight of the polyurethane polymer upon long-term storage. This is considered to be attributable to such an effect that the phosphonic acid group which can be present as a polyvalent anion in the ink attracts a metal ion which acts as a catalyst for the cleavage reaction of the ether linkage in the ink, thereby bringing about an effect to inhibit the cleavage reaction from being promoted.

In addition, an investigation by the present inventors has revealed that when the surface charge amount of the self-dispersion pigment in which a phosphonic acid group is bonded directly or through another atomic group to the surface thereof is 0.25 mmol/g or more and 0.42 mmol/g or less, the effect to inhibit the lowering of the molecular weight of the polyurethane polymer upon the long-term storage is more markedly achieved, and the dispersion stability of the pigment upon the long-term storage is improved to inhibit the pigment from aggregating. If the surface charge amount is less than 0.25 mmol/g, the dispersion stability of the pigment becomes low, and the pigment aggregates upon the long-term storage. If the surface charge amount is more than 0.42 mmol/g on the other hand, the effect to inhibit the lowering of the molecular weight of the polyurethane polymer upon the long-term storage is not achieved though the dispersion stability of the pigment is improved. This is considered to be attributable to the situation that if the surface charge amount is too high, electrostatic repulsive force between the pigment particle and the acid group of the polyurethane polymer becomes high, and the polyurethane polymer is hard to be present in the neighborhood of the pigment particle, whereby the effect to inhibit the radical-generating reaction is lowered.

The effect of the present invention that the aggregation of the pigment is inhibited even when the ink is stored for a long period of time and the image excellent in fastness is obtained can be achieved by the synergistic effect of the respective components like the above-described mechanism.

Ink:

The respective components constituting the ink according to the present invention will hereinafter be respectively described.

Polyurethane Polymer:

The polyurethane polymer used in the ink according to the present invention will now be described below.

Polyisocyanate

The term "polyisocyanate" in the present invention means a compound having two or more isocyanate groups. Specific examples of a polyisocyanate usable in the present invention include aliphatic polyisocyanates, alicyclic polyisocyanates, aromatic polyisocyanates and aromatic-aliphatic polyisocyanates. The proportion (% by mass) of a unit derived from the polyisocyanate in the polyurethane polymer is favorably 10% by mass or more and 80% by mass or less.

Examples of the aliphatic polyisocyanates include tetramethylenediisocyanate, dodecamethylenediisocyanate, hexamethylenediisocyanate, 2,2,4-trimethylhexamethylene-diisocyanate, 2,4,4-trimethylhexamethylenediisocyanate, lysinediisocyanate, 2-methylpentane-1,5-diisocyanate and 3-methylpentane-1,5-diisocyanate. Examples of the alicyclic polyisocyanates include isophoronediisocyanate, hydrogenated xylylenediisocyanate, dicyclohexylmethane-4,4'-diisocyanate, 1,4-cyclohexanediisocyanate, methylcyclohexylenediisocyanate and 1,3-bis-(isocyanatomethyl) cyclohexane. Examples of the aromatic polyisocyanates include tolylenediisocyanate, 2,2'-diphenylmethanediisocyanate, 2,4'-diphenylmethane-diisocyanate, 4,4'-diphenylmethanediisocyanate, 4,4'-dibenzyldiisocyanate, 1,5-naphthylenediisocyanate, xylylenediisocyanate, 1,3-phenylenediisocyanate and 1,4-phenylenediisocyanate. Examples of the aromatic-aliphatic polyisocyanates include dialkyldiphenylmethanediisocyanates, tetraalkyldiphenylmethanediisocyanates and α,α,α,α-tetramethylxylylenediisocyanate. These polyisocyanates may be used either singly or in any combination thereof as needed.

In the present invention, at least one selected from isophoronediisocyanate and dicyclohexylmethane-4,4'-diisocyanate is favorably used. Isophoronediisocyanate is more favorably used. In the structure of the polyurethane polymer, the unit derived from the polyisocyanate is present as a hydrophobic moiety. Since isophoronediisocyanate among the polyisocyanates has two methyl groups on the 3-position carbon of the cyclohexane ring, it has particularly high hydrophobicity, and so the polyurethane polymer having the unit derived from isophoronediisocyanate easily undergoes hydrophobic interaction with a hydrophobic surface of a pigment particle. As a result, the polyurethane polymer can be present in closer vicinity to the pigment particle, so that the effect to inhibit the radical-generating reaction becomes high to provide an image high in fastness even after the ink is stored for a long period of time. In the present invention, the proportion (% by mass) of a unit derived from isophoronediisocyanate in the polyurethane polymer is particularly favorably 10 mol % or more based on the proportion of units derived from polyisocyanates because the effect to improve the fastness of the image upon the long-term storage becomes high.

Polyether Polyol Having No Acid Group

The polyurethane polymer used in the ink according to the present invention has a unit derived from a polyether polyol having no acid group. The proportion (% by mass) of the unit derived from the polyether polyol having no acid group in the polyurethane polymer is favorably 0.1% by mass or more and 80.0% by mass or less. The number-average molecular weight of the polyether polyol having no acid group as determined by GPC is favorably 450 or more and 4,000 or less in terms of polystyrene. Incidentally, another polyol having no acid group than the polyether polyol may be further used together with the polyether polyol having no acid group to synthesize the polyurethane polymer. In such a case, the proportion (% by mol) of the unit derived from the polyether polyol having no acid group in the units derived from all the polyols having no acid group in the polyurethane polymer is favorably 80 mol % or more and 100 mol % or less.

Examples of the polyether polyol include polyalkylene glycols and addition polymers of an alkylene oxide and a dihydric alcohol or a trihydric or still higher polyhydric alcohol. Examples of the polyalkylene glycols include polyethylene glycol, polypropylene glycol, polytetramethylene glycol, poly(1,2-butylene glycol), poly(1,3-butylene glycol) and ethylene glycol-propylene glycol copolymers. Examples of the dihydric alcohol include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane and 4,4'-dihydroxyphenylmethane. Examples of the trihydric or still higher polyhydric alcohol include glycerol, trimethylolpropane, 1,2,5-hexanetriol, 1,2,6-hexanetriol and pentaerythritol. Examples of the alkylene oxide include ethylene oxide, propylene oxide, butylene oxide and α-olefin oxides. These polyether polyols may be used either singly or in any combination thereof as needed.

In the present invention, the polyether polyol having no acid group favorably includes at least one selected from polyethylene glycol, polypropylene glycol, poly(1,2-butylene glycol) and poly(1,3-butylene glycol). It has been confirmed that when these polyether polyols are used, the strength and flexibility of the resulting polyurethane polymer are improved, so that the fastness of a resulting image is more improved. The proportion (% by mol) of units derived from polyethylene glycol, polypropylene glycol, poly(1,2-butylene glycol) and poly(1,3-butylene glycol) in all units derived from the polyether polyols in the polyurethane polymer is favorably 80 mol % or more and 100 mol % or less. In particular, the polyether polyol having no acid group more favorably includes polypropylene glycol. The reason for this is considered to be attributable to such an effect that when polypropylene glycol is used, a balance between strength and flexibility in a film formed of the resulting polyurethane polymer is improved.

Diol Having an Acid Group

The polyurethane polymer used in the ink according to the present invention has a unit derived from a diol having an acid group. In the present invention, the diol having the acid group means a diol having an acid group such as a carboxyl group, a sulfonic acid group or a phosphoric acid group. The diol having the acid group may also be present in the form of a salt with an alkali metal such as Li, Na or K, ammonia, or an organic amine such as dimethylamine. As the diol having the acid group, dimethylolpropionic acid or dimethylol-butanoic acid is favorably used. These compounds may be used either singly or in any combination thereof as needed. The proportion (% by mass) of a unit derived from the diol having the acid group in the polyurethane polymer is favorably 5.0% by mass or more and 40.0% by mass or less. In the present invention, the acid value of the polyurethane polymer based on the unit derived from the diol having the acid group is favorably 40 mg KOH/g or more and 140 mg KOH/g or less. If the acid value is less than 40 mg KOH/g, the hydrophilicity of the polyurethane polymer is lowered, and the ejection stability of the resulting ink may not be sufficiently achieved in some cases. If the acid value is more than 140 mg KOH/g, the hydrophilicity of the polyurethane polymer becomes high, and the fastness of the resulting image may not be sufficiently achieved in some cases.

Chain Extender

In the present invention, a chain extender may also be used upon the synthesis of the polyurethane polymer. The chain extender is a compound reacting with a residual isocyanate group which has not formed a urethane linkage of the polyisocyanate unit in a urethane prepolymer. Examples of the chain extender include polyvalent amine compounds such as trimethylolmelamine and derivatives thereof, dimethylolurea and derivatives thereof, dimethylolethylamine, diethanol/methylamine, dipropanol-ethylamine, dibutanolmethylamine, ethylenediamine, propylenediamine, diethylenetriamine, hexylenediamine, triethylenetetramine, tetraethylenepentamine, isophorone-diamine, xylylenediamine, diphenylmethanediamine, hydrogenated diphenylmethanediamine and hydrazine, polyamide-polyamine, and polyethylene-polyimine. Other examples thereof include ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerol, trimethylolpropane and pentaerythritol. These chain extenders may be used either singly or in any combination thereof as needed.

Property of Polyurethane Polymer

In the present invention, the content (% by mass) of the polyurethane polymer is favorably 0.1% by mass or more and 10.0% by mass or less based on the total mass of the ink. If the content is less than 0.1% by mass, the effect to improve the fastness of the image may not be sufficiently achieved in some cases. If the content is more than 10.0% by mass on the other hand, the effect to improve the ejection stability of the ink may not be sufficiently achieved in some cases.

The content (% by mass) of the polyurethane polymer in the ink is favorably 0.05 times or more and 2.00 times or less in terms of mass ratio with respect to the content (% by mass) of a pigment based on the total mass of the ink. If the mass ratio is less than 0.05 times, the effect to improve the fastness of the image may not be sufficiently achieved in some cases. If the mass ratio is more than 2.00 times on the other hand, the effect to improve the fastness of the image when the ink is stored for a long period of time may not be sufficiently achieved in some cases.

The weight-average molecular weight (Mw) of the polyurethane polymer used in the ink according to the present invention as determined by GPC is favorably more than 30,000 and not more than 150,000 in terms of polystyrene. If the molecular weight is not more than 30,000, the strength of the polyurethane polymer becomes low, and the effect to improve the fastness of the image may not be sufficiently achieved in some cases. If the molecular weight is more than 150,000 on the other hand, the viscosity of the ink is apt to increase, and the ejection stability of the ink may not be sufficiently improved in some cases.

Synthetic Process of Polyurethane Polymer

As a synthetic process of the polyurethane polymer in the present invention, any process heretofore generally used may be used. For example, the following process is mentioned. A polyisocyanate, a polyol having no acid group and a diol having an acid group are caused to react with one another, thereby synthesize a urethane prepolymer having an isocyanate group at a terminal of its molecule. Thereafter, an acid group in the urethane prepolymer is neutralized with a neutralizer. After this neutralized urethane prepolymer is then poured into an aqueous solution containing a chain extender to conduct a reaction, an organic solvent in the system is removed if contained, whereby the polyurethane polymer can be obtained.

Analysis Method of Polyurethane Polymer

The analysis of the polyurethane polymer may be conducted in a state of an ink. However, when the polyurethane polymer is extracted, precision of the analysis can be made higher. Specifically, a sample obtained by centrifuging ink at 80,000 rpm, subjecting the solution other than solid matter to acid precipitation with hydrochloric acid and drying the resultant deposit is used. Since the polyurethane polymer is contained in this sample, the composition, acid value and molecular weight of the polyurethane polymer can be analyzed according to the following respective methods by using this sample.

(1) Composition of Polyurethane Polymer

The composition (kinds of the polyisocyanate, the polyether polyol having no acid group and the diol having an acid group) of the polyurethane polymer can be identified by positions of peaks of chemical shifts obtained by dissolving the sample obtained above in deuterated dimethyl sulfoxide (deuterated DMSO) and subjecting the resultant solution to measurement by proton nuclear magnetic resonance ($^1$H-NMR) or carbon nuclear magnetic resonance ($^{13}$C-NMR), or by subjecting the sample obtained above to measurement by pyrolysis gas chromatography. The compositional ratio among the respective components can be calculated from the ratio among integrated values of the peaks of the respective chemical shifts. When the kind of the polyether polyol having no acid group is known in this manner, the number-average molecular weight thereof can be calculated.

(2) Measuring Method of Acid Value of Polyurethane Polymer

The acid value of the polyurethane polymer can be measured by a titrimetric method. In Examples which will be described subsequently, the acid value was measured by dissolving the polyurethane polymer in THF and subjecting the resultant solution to potentiometric titration with an ethanol solution titrant of potassium hydroxide by means of a potentiometric automatic titrator AT510 (manufactured by KYOTO ELECTRONICS MANUFACTURING CO., LTD.).

(3) Measuring Method of Average Molecular Weight of Polyurethane Polymer

The weight-average molecular weight of the polyurethane polymer can be measured by GPC. In Examples which will be described subsequently, the measurement by GPC was conducted by using an apparatus: Alliance GPC 2695 (manufactured by Waters), 4-successive columns: Shodex KF-806M (manufactured by Showa Denko) and a detector: RI (refractive index) to calculate the average molecular weight by using PS-1 and PS-2 (products of Polymer Laboratories) as polystyrene standard samples.

Self-Dispersion Pigment in which a Phosphonic Acid Group is Bonded Directly or Through Another Atomic Group to the Surface Thereof:

The ink according to the present invention contains a self-dispersion pigment in which a phosphonic acid group is bonded directly or through another atomic group to the surface thereof. Incidentally, the form of the phosphonic acid group in the ink may be any form of that in which a part thereof is dissociated and that in which the whole thereof is dissociated.

The content (% by mass) of the self-dispersion pigment in which the phosphonic acid group is bonded directly or through another atomic group to the surface thereof in the ink is favorably 0.1% by mass or more and 15.0% by mass or less, more favorably 1.0% by mass or more and 10.0% by mass or more based on the total mass of the ink. If the content is less than 1.0% by mass, a sufficient image density may not be achieved in some cases. If the content is more than 10.0% by mass, the sticking resistance of a resulting ink may not be sufficiently achieved in some cases.

In the present invention, the average particle size (average particle size $D_{50}$ based on volume) of the self-dispersion pigment is favorably 50 nm or more and 150 nm or less. Incidentally, in Examples which will be described subsequently, Microtrac UPA-EX150 (manufactured by NIKKISO) was used to measure the average particle size of the pigment.

In the present invention, examples of the self-dispersion pigment in which the phosphonic acid group is bonded directly or through another atomic group to the surface thereof include a pigment in which a phosphonic acid group is bonded to the surface of a pigment particle (phosphonic acid group-modified self-dispersion pigment) and a pigment in which a polymer having a phosphonic acid group is bonded to the surface of a pigment particle (polymer-bonded self-dispersion pigment). The use of such a self-dispersion pigment makes addition of a dispersant for dispersing a pigment in an ink unnecessary or can make the amount of the dispersant added small. In the present invention, the phosphonic-acid-group-modified self-dispersion pigment is more favorably used.

Phosphonic Acid Group

In the present invention, the phosphonic acid group is bonded directly or through another atomic group (—R—) to the surface of the pigment particle. Examples of the phosphonic acid group include $PO_3HM$ and $PO_3M_2$. Incidentally, M in the above-mentioned formulae is a hydrogen atom, alkali metal, ammonium or organic ammonium. In particular, the phosphonic acid group more favorably has a structure of —CQ(PO$_3$M$_2$)$_2$. Q in the above formula is a hydrogen atom, R', OR', SR' or NR'$_2$, where R's are, independently of one another, a hydrogen atom, or an alkyl, acyl, aralkyl or aryl group. Specifically, examples of the alkyl group include methyl and ethyl groups, examples of the acyl group include acetyl and benzoyl groups, examples of the aralkyl group include a benzyl group, and examples of the aryl group include phenyl and naphthyl groups. Among these, —CH(PO$_3$M$_2$)$_2$ in which R' is a hydrogen atom is particularly favorable in the present invention. Examples of another atomic group (—R—) include an amide group, an amino group, a ketone group, an ester group, an ether group, an alkylene group having 1 to 12 carbon atoms, a substituted or unsubstituted phenylene group and a substituted or unsubstituted naphthylene group. In the present invention, —R— favorably contains —C$_6$H$_4$—CONH— (benzamide structure). In the present invention, plural phosphonic acid groups may also be bonded to a carbon atom of said another atomic group (—R—). Specifically, self-dispersion pigments in which an atomic group to which a bisphosphonic acid or triphosphonic acid group is bonded is bonded to the surface thereof are mentioned. In particular, a self-dispersion pigments in which an atomic group to which a bisphosphonic acid group is bonded is bonded to the surface thereof is favorable from the viewpoint of improving the fastness of the image and the dispersion stability of the pigment upon long-term storage at the same time.

Kind of Pigment

Examples of a pigment usable in the ink according to the present invention include inorganic pigments such as carbon black and organic pigments, and all pigments publicly known as those usable in an ink may be used. According to an investigation by the present inventors, an inorganic pigment, particularly carbon black, is favorably used because the interaction between the polyurethane polymer and the pigment more easily occurs compared with an organic pigment, so that the effect to inhibit the radical-generating reaction becomes higher to produce a good effect to improve the fastness of an image upon long-term storage.

The carbon black used in the ink according to the present invention may be any of those heretofore generally used in an ink. Specific examples thereof include furnace black, acetylene black, channel black, thermal black and lamp black. More specifically, such commercially available carbon black as mentioned below may be used. Examples thereof include Raven: 7000, 5750, 5250, 5000 ULTRA, 3500, 2000, 1500, 1255, 1250, 1200, 1190 ULTRA-II and 1170 (all, products of Columbian); Monarch: 700, 800, 880, 900, 1000, 1100, 1300, 1400 and 2000 (all, products of Cabot); Black Pearls: 880, 800 and L (all, products of Cabot); Color Black: FW1, FW2, FW2V, FW18, FW200, 5150, 5160 and 5170 (all, products of Degussa); Printex: 85, 95, 140U, 140V, U and V (all, products of Degussa); Special Black: 6, 5, 4A and 4 (all, products of Degussa AG); and No. 900, No. 1000 No. 2200B, No. 2300, No. 2350, No. 2400R and MCF-88 (all, products of MITSUBISHI CHEMICAL CORPORATION). Needless to say, a carbon black newly prepared for the present invention may also be used.

Analysis Method of Pigment

A method for verifying whether a pigment contained in an ink is a self-dispersion pigment or not is as follows. Specifically, after ink is subjected to acid precipitation, centrifugation is conducted to collect a precipitate. In the case of a pigment dispersion, the pigment dispersion is subjected to acid precipitation to collect a precipitate. The precipitate collected is placed in a Petri dish, water is poured therein, and stirring is conducted to re-disperse the precipitate. When a precipitate does not occur in the Petri dish after the resultant dispersion is left to stand for one day, and the pigment is dispersed, the pigment contained in the ink is determined to be a self-dispersion pigment.

When the pigment contained in ink is a self-dispersion pigment, whether the pigment has a phosphonic acid group or not can be verified by an ICP emission spectrometer. Specifically, when a phosphorus atom is identified by using the ICP emission spectrometer, the self-dispersion pigment is determined to have the phosphonic acid group.

In the present invention, the surface charge amount of the pigment is determined by colloid titration. In Examples which will be described subsequently, a potentiometric automatic titrator (AT-510, manufactured by KYOTO ELECTRONICS MANUFACTURING CO., LTD.) with a flow potential titration unit (PCD-500) installed therein was used to measure the surface charge amount of a pigment in a pigment dispersion liquid by colloid titration utilizing a potential difference. At this time, methyl glycol chitosan was used as a titrant. Incidentally, of course, the measurement of the surface charge amount may be conducted by using a pigment extracted from an ink by a proper method. In addition, the concentration of the pigment in the ink may also be adjusted with water as needed.

Water-Soluble Organic Compound:

The ink according to the present invention may contain a water-soluble organic compound. The content (% by mass) of the water-soluble organic compound in the ink is favorably 3.0% by mass or more and 50.0% by mass or less based on the total mass of the ink. The water-soluble organic compound may be that which is solid or liquid at ordinary temperature, and any compound heretofore generally used may be used. Examples thereof include alcohols, glycols, alkylene glycols the alkylene group of which has 2 to 6 carbon atoms, polyethylene glycols, nitrogen-containing compounds, and sulfur-containing compounds. These water-soluble organic compounds may be used either singly or in any combination thereof as needed as needed.

In the present invention, at least one compound selected from compounds represented by the following general formulae (1) to (3) among the water-soluble organic compounds is favorably contained from the viewpoint of the fastness of an image upon long-term storage. The reason for this is described below.

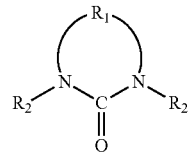

General formula (1)

wherein $R_1$ is an alkylene group which may be substituted and has 2 to 5 carbon atoms, and $R_2$'s are, independently of each other, a hydrogen atom or an alkyl group which may be substituted and has 1 to 4 carbon atoms;

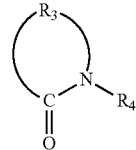

General formula (2)

wherein $R_3$ is an alkylene group which may be substituted and has 2 to 5 carbon atoms, and $R_4$ is a hydrogen atom or an alkyl group which may be substituted and has 1 to 4 carbon atoms; and

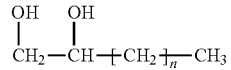

General formula (3)

wherein n is 1 to 3.

A part of the polyurethane polymer exists in a state in which a plurality of polymer molecules are aggregated or associated by hydrophobic interaction between the polymer molecules. Since the polyurethane polymer existing in such a state is present with a hydrophilic moiety of the polymer outside and a hydrophobic moiety thereof inside, hydrophobic interaction with the pigment is hard to occur. On the other hand, the compounds represented by the general formulae (1) to (3) have high affinity for the unit derived from the polyether polyol in the polyurethane polymer. Therefore, when the compounds represented by the general formulae (1) to (3) are contained together with the polyurethane polymer in ink, the solubility of the polyurethane polymer is enhanced to break the aggregated or associated state, so that the polymer molecules are apt to exist individually. As a result, it is considered that the polyurethane polymer can be present in closer vicinity to the pigment particle by the hydrophobic interaction, so that the effect to inhibit the radical-generating reaction becomes high to produce a good effect to improve the fastness of the image upon the long-term storage. In the present invention, the content (% by mass) of the compounds represented by the general formulae (1) to (3) based on the total mass of the ink is favorably 2.0 times or more and 10.0 times or less in terms of mass ratio with respect to the content (% by mass) of the polyurethane polymer.

Examples of the compound represented by the general formula (1) include 2-imidazolidinone (ethyleneurea) and 1,3-dimethyl-2-imidazolidinone. Examples of the compound represented by the general formula (2) include 2-pyrrolidone and N-methyl-2-pyrrolidone. The compound represented by the general formula (3) is a 1,2-alkanediol, and examples thereof include 1,2-propanediol, 1,2-butanediol, 1,2-pentanediol and 1,2-hexanediol. Among these, at least one selected from 2-pyrrolidone, N-methyl-2-pyrrolidone, ethyleneurea and 1,2-hexanediol is particularly favorably used.
Water:

The ink according to the present invention may contain water. Deionized water (ion-exchanged water) is favorably used as water. The content (% by mass) of water in the ink is favorably 50.0% by mass or more and 95.0% by mass or less based on the total mass of the ink.

Other Components:

The ink according to the present invention may also contain additives such as a surfactant, a pH adjustor, a rust preventive, a preservative, a mildewproofing agent, an antioxidant, an anti-reducing agent, an evaporation accelerator, a chelating agent and another polymer than the polyurethane polymer, as needed.

Ink Cartridge:

The ink cartridge according to the present invention has an ink storage portion storing an ink, and the ink according to the present invention is stored in the ink storage portion. The structure of the ink cartridge is such that the ink storage portion is formed by an ink storage chamber storing a liquid ink and a negative pressure generating member storage chamber storing a negative pressure generating member holding the ink in the interior thereof by a negative pressure. The ink storage portion of the ink cartridge may also be so constructed that the whole amount of the ink stored is held in the negative pressure generating member without providing the ink storage chamber storing the liquid ink. In addition, the ink cartridge may be constructed so as to have an ink storage portion and a recording head.

Ink Jet Recording Method:

The ink jet recording method according to the present invention is an ink jet recording method in which an ink is ejected from an ejection orifice of a recording head by an ink jet system in response to a recording signal to conduct recording on a recording medium, and the ink according to the present invention is used. In the present invention, an ink jet recording method in which thermal energy is caused to act on an ink to eject the ink from an ejection orifice of a recording head is particularly favorable. Incidentally, "recording" in the present invention include a mode of conducting recording on a recording medium with the ink according to the present invention and a mode of conducting printing on a non-permeable base material such as glass, plastic or film with the ink according to the present invention. Examples of the recording medium include plain paper and what is called glossy paper provided with a porous ink receiving layer containing an inorganic pigment and a binder on a gas-permeable support (for example, paper). In the present invention, recording is favorably conducted on plain paper with the ink according to the present invention because the effect of the present invention is particularly exhibited.

FIG. 1 is a perspective view illustrating a mechanism portion of an ink jet recording apparatus. Upon feeding of paper, a predetermined number of recording media is first sent to a nip portion constructed by a paper feed roller and a separating roller in a paper feeding portion including a paper feeding tray. The recording media are separated in the nip portion, and only a recording medium located uppermost is conveyed. The recording medium sent to a conveying portion is guided to a pinch roller holder M3000 and a paper guide flapper and sent to a pair of rollers of a conveying roller M3060 and a pinch roller M3070. The pair of rollers composed of the conveying roller M3060 and the pinch roller M3070 are rotated by driving of an LF motor, and the recording medium is conveyed on a platen M3040 by this rotation.

Upon forming of an image, a recording head is arranged at an intended image forming position in a carriage portion, and an ink is ejected on the recording medium according to a signal from an electric substrate. While conducting recording by a recording head in the ink jet recording apparatus, main scanning in which a carriage M4000 scans in a column direction and secondary scanning in which the conveying roller M3060 conveys the recording medium in a row direction are alternately repeated, thereby forming an image on the recording medium. The recording medium, on which the image has been formed, is nipped between a first paper discharging roller M3110 and a spur in a paper discharging portion, conveyed and finally discharged on a paper discharging tray.

Figure 2:
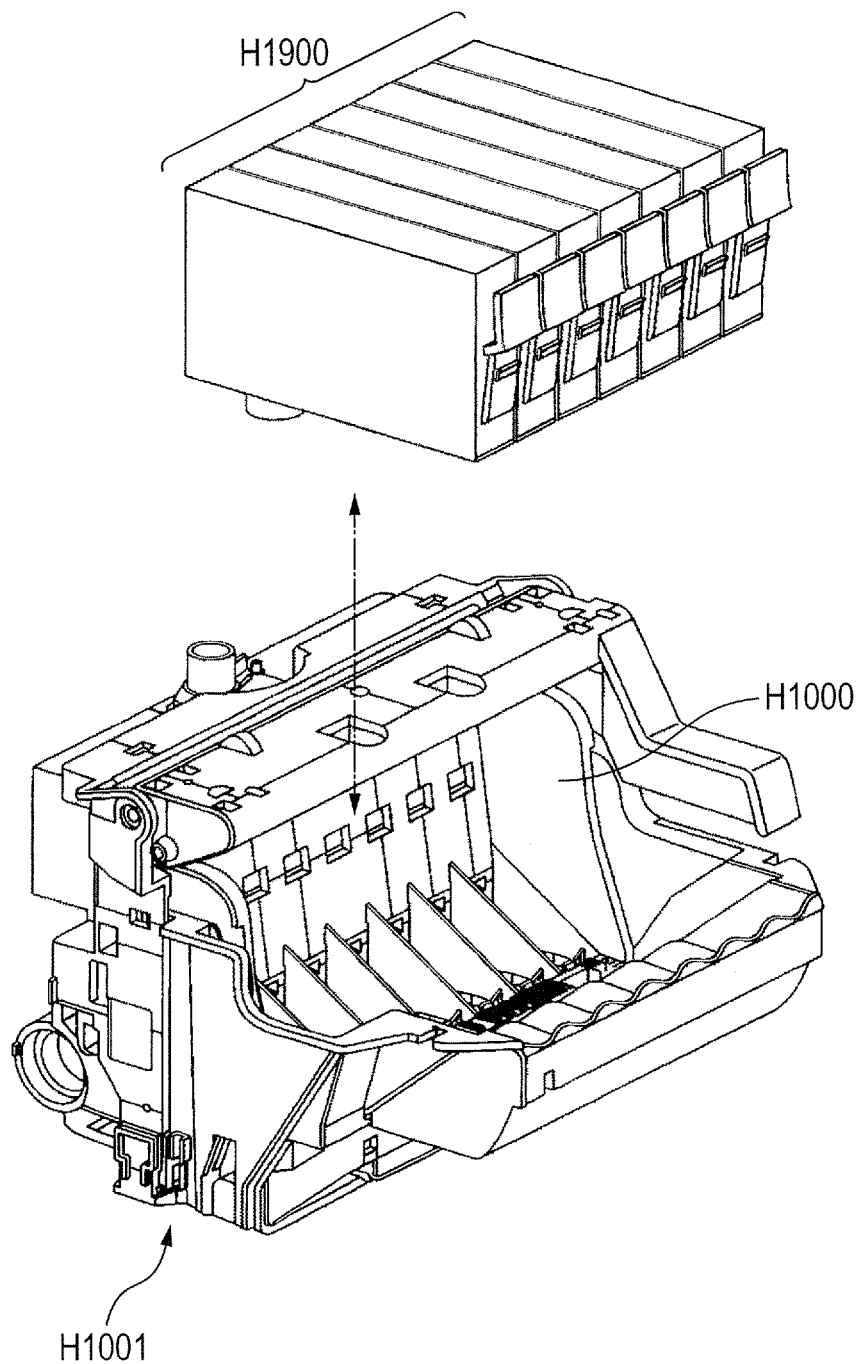
FIG. 2 is a perspective view illustrating a state in which an ink cartridge is installed in a head cartridge.

FIG. 2 is a perspective view illustrating a state in which an ink cartridge H1900 is installed in a head cartridge H1000. The ink jet recording apparatus according to this embodiment forms an image with respective inks of yellow, magenta, cyan, black, light magenta, light cyan and green. Accordingly, ink cartridges H1900 for seven colors are independently provided. The ink according to the present invention is used as at least one ink of the inks described above. As illustrated in FIG. 2, each ink cartridge H1900 is detachably installed in the head cartridge H1000. Incidentally, the ink cartridge H1900 can be detachably installed in a state in which the head cartridge H1000 has been installed in the carriage M4000.

The present invention will hereinafter be described in more detail by the following Examples and Comparative Examples. However, the present invention is not limited by the following examples unless going beyond the gist of the present invention. Incidentally, all designations of "part" or "parts" described in the following examples are based on mass unless expressly noted.

Preparation of Pigment Dispersion:

Pigment dispersions were prepared in the following manner. The kinds of the resultant pigment dispersions, the kinds of functional groups or polymers for dispersing a pigment and surface charge amounts are shown in Table 1 collectively.

Preparation of Pigment Dispersion A

Seven grams of C.I. Pigment Blue 15:3 having a specific surface area of 90 m$^2$/g, 14.0 mmol of sodium ((4-aminobenzoylamino)-methane-1,1-diyl)bisphosphonate, 40.0 mmol of nitric acid and 200 mL of pure water were mixed at room temperature and 6,000 rpm by a Silverson mixer. After minutes, a solution with 40.0 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion.

By the above-described process, was obtained Pigment Dispersion A in a state in which C.I. Pigment Blue 15:3 in which a bisphosphonic acid group whose counter ion was potassium was bonded to the surface of the pigment particle through an atomic group containing —$C_6H_4$—CONH— (benzamide structure) was dispersed in water. The surface charge amount of the self-dispersion pigment prepared above was measured by the method described above and was found to be 0.34 mmol/g. Incidentally, the pH of the Pigment Dispersion A was 10.0, and the average particle size of the pigment was 120 nm.

Preparation of Pigment Dispersion B

Seven grams of C.I. Pigment Blue 15:3 having a specific surface area of 90 m$^2$/g, 9.0 mmol of sodium ((4-aminobenzoylamino)-methane-1,1-diyl)bisphosphonate, 26.0 mmol of nitric acid and 200 mL of pure water were mixed at room temperature and 6,000 rpm by a Silverson mixer. After minutes, a solution with 26.0 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion B in a state in which C.I. Pigment Blue 15:3 in which a bisphosphonic acid group whose counter ion was potassium was bonded to the surface of the pigment particle through an atomic group containing —C$_6$H$_4$—CONH— (benzamide structure) was dispersed in water. The surface charge amount of the self-dispersion pigment prepared above was measured by the method described above and was found to be 0.25 mmol/g. Incidentally, the pH of the Pigment Dispersion B was 10.0, and the average particle size of the pigment was 120 nm.

Preparation of Pigment Dispersion C

Seven grams of C.I. Pigment Blue 15:3 having a specific surface area of 90 m$^2$/g, 20.0 mmol of sodium ((4-aminobenzoylamino)-methane-1,1-diyl)bisphosphonate, 57.0 mmol of nitric acid and 200 mL of pure water were mixed at room temperature and 6,000 rpm by a Silverson mixer. After minutes, a solution with 57.0 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion C in a state in which C.I. Pigment Blue 15:3 in which a bisphosphonic acid group whose counter ion was potassium was bonded to the surface of the pigment particle through an atomic group containing —C$_6$H$_4$—CONH— (benzamide structure) was dispersed in water. The surface charge amount of the self-dispersion pigment prepared above was measured by the method described above and was found to be 0.42 mmol/g. Incidentally, the pH of the Pigment Dispersion C was 10.0, and the average particle size of the pigment was 120 nm.

Preparation of Pigment Dispersion D

Seven grams of C.I. Pigment Red 122 having a specific surface area of 130 m$^2$/g, 18.0 mmol of sodium ((4-aminobenzoylamino)-methane-1,1-diyl)bisphosphonate, 51.0 mmol of nitric acid and 200 mL of pure water were mixed at room temperature and 6,000 rpm by a Silverson mixer. After minutes, a solution with 51.0 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion D in a state in which C.I. Pigment Red 122 in which a bisphosphonic acid group whose counter ion was potassium was bonded to the surface of the pigment particle through an atomic group containing —C$_6$H$_4$—CONH— (benzamide structure) was dispersed in water. The surface charge amount of the self-dispersion pigment prepared above was measured by the method described above and was found to be 0.34 mmol/g. Incidentally, the pH of the Pigment Dispersion D was 10.0, and the average particle size of the pigment was 120 nm.

Preparation of Pigment Dispersion E

Twenty grams of Black Pearls 880 (product of Cabot) having a specific surface area of 220 m$^2$/g, 5.3 mmol of sodium ((4-aminobenzoylamino)-methane-1,1-diyl)-bisphosphonate, 15.1 mmol of nitric acid and 200 mL of pure water were mixed at room temperature and 6,000 rpm by a Silverson mixer. After 30 minutes, a solution with 15.1 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion E in a state in which a carbon black in which a bisphosphonic acid group whose counter ion was potassium was bonded to the surface of the pigment particle through an atomic group containing —C$_6$H$_4$—CONH— (benzamide structure) was dispersed in water. The surface charge amount of the self-dispersion pigment prepared above was measured by the method described above and was found to be 0.34 mmol/g. Incidentally, the pH of the Pigment Dispersion A was 10.0, and the average particle size of the pigment was 120 nm.

Preparation of Pigment Dispersion F

Twenty grams of Black Pearls 880 (product of Cabot) having a specific surface area of 220 m$^2$/g, 3.9 mmol of sodium ((4-aminobenzoylamino)-methane-1,1-diyl)-bisphosphonate, 11.1 mmol of nitric acid and 200 mL of pure water were mixed at room temperature and 6,000 rpm by a Silverson mixer. After 30 minutes, a solution with 11.1 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion F in a state in which a carbon black in which a bisphosphonic acid group whose counter ion was potassium was bonded to the surface of the pigment particle through an atomic group containing C$_6$H$_4$—CONH— (benzamide structure) was dispersed in water. The surface charge amount of the self-dispersion pigment prepared above was measured by the method described above and was found to be 0.25 mmol/g. Incidentally, the pH of the Pigment Dispersion A was 10.0, and the average particle size of the pigment was 120 nm.

Preparation of Pigment Dispersion G

Twenty grams of Black Pearls 880 (product of Cabot) having a specific surface area of 220 m$^2$/g, 6.5 mmol of sodium ((4-aminobenzoylamino)-methane-1,1-diyl)-bisphosphonate, 18.7 mmol of nitric acid and 200 mL of pure water were mixed at room temperature and 6,000 rpm by a Silverson mixer. After 30 minutes, a solution with 18.7 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion G in a state in which a carbon black in which a bisphosphonic acid group whose counter ion was potassium was bonded to the surface of the pigment particle through an atomic group containing —$C_6H_4$—CONH— (benzamide structure) was dispersed in water. The surface charge amount of the self-dispersion pigment prepared above was measured by the method described above and was found to be 0.42 mmol/g. Incidentally, the pH of the Pigment Dispersion A was 10.0, and the average particle size of the pigment was 120 nm.

Preparation of Pigment Dispersion H

Twenty grams of Black Pearls 880 (product of Cabot) having a specific surface area of 220 m$^2$/g, 3.7 mmol of sodium ((4-aminobenzoylamino)-methane-1,1-diyl)-bisphosphonate, 10.7 mmol of nitric acid and 200 mL of pure water were mixed at room temperature and 6,000 rpm by a Silverson mixer. After 30 minutes, a solution with 10.7 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion H in a state in which a carbon black in which a bisphosphonic acid group whose counter ion was potassium was bonded to the surface of the pigment particle through an atomic group containing —$C_6H_4$—CONH— (benzamide structure) was dispersed in water. The surface charge amount of the self-dispersion pigment prepared above was measured by the method described above and was found to be 0.24 mmol/g. Incidentally, the pH of the Pigment Dispersion A was 10.0, and the average particle size of the pigment was 120 nm.

Preparation of Pigment Dispersion I

Seven grams of C.I. Pigment Blue 15:3 having a specific surface area of 90 m$^2$/g, 9.0 mmol of sodium ((4-aminobenzoylamino)-methane-1,1-diyl)bisphosphonate, 24.0 mmol of nitric acid and 200 mL of pure water were mixed at room temperature and 6,000 rpm by a Silverson mixer. After minutes, a solution with 24.0 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion I in a state in which C.I. Pigment Blue 15:3 in which a bisphosphonic acid group whose counter ion was potassium was bonded to the surface of the pigment particle through an atomic group containing —$C_6H_4$—CONH— (benzamide structure) was dispersed in water. The surface charge amount of the self-dispersion pigment prepared above was measured by the method described above and was found to be 0.24 mmol/g. Incidentally, the pH of the Pigment Dispersion I was 10.0, and the average particle size of the pigment was 120 nm.

Preparation of Pigment Dispersion J

Twenty grams of Black Pearls 880 (product of Cabot) having a specific surface area of 220 m$^2$/g, 6.7 mmol of sodium ((4-aminobenzoylamino)-methane-1,1-diyl)-bisphosphonate, 19.1 mmol of nitric acid and 200 mL of pure water were mixed at room temperature and 6,000 rpm by a Silverson mixer. After 30 minutes, a solution with 19.1 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion J in a state in which a carbon black in which a bisphosphonic acid group whose counter ion was potassium was bonded to the surface of the pigment particle through an atomic group containing —$C_6H_4$—CONH— (benzamide structure) was dispersed in water. The surface charge amount of the self-dispersion pigment prepared above was measured by the method described above and was found to be 0.43 mmol/g. Incidentally, the pH of the Pigment Dispersion J was 10.0, and the average particle size of the pigment was 120 nm.

Preparation of Pigment Dispersion K

Seven grams of C.I. Pigment Blue 15:3 having a specific surface area of 90 m$^2$/g, 20.0 mmol of sodium ((4-aminobenzoylamino)-methane-1,1-diyl)bisphosphonate, 57.0 mmol of nitric acid and 200 mL of pure water were mixed at room temperature and 6,000 rpm by a Silverson mixer. After minutes, a solution with 57.0 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing a pigment dispersion. By the above-described process, was obtained Pigment Dispersion K in a state in which C.I. Pigment Blue 15:3 in which a bisphosphonic acid group whose counter ion was potassium was bonded to the surface of the pigment particle through an atomic group containing —$C_6H_4$—CONH— (benzamide structure) was dispersed in water. The surface charge amount of the self-dispersion pigment prepared above was measured by the method described above and was found to be 0.43 mmol/g. Incidentally, the pH of the Pigment Dispersion K was 10.0, and the average particle size of the pigment was 120 nm.

Preparation of Pigment Dispersion L

In a state of being cooled to 5° C., 8.28 mmol of 4-aminophthalic acid was added into a solution with 60 mmol of concentrated hydrochloric acid dissolved in 5.5 g of water. A container containing this solution was then placed in an ice bath, thereby constantly keeping the solution at a temperature not higher than 10° C. In this state, a solution with 21.2 mmol of sodium nitrite dissolved in 9 g of water at 5° C. was added into this solution. After this solution was stirred additionally for minutes, 6 g of Black Pearls 880 (product of Cabot) having a specific surface area of 220 m$^2$/g was added under stirring. Thereafter, the stirring was conducted additionally for 15 minutes, the resultant slurry was filtered through filter paper (trade name: Toyo Filter Paper No. 2; product of Advantec), and the resultant particle was fully washed with water. This particle was dried in an oven controlled to 110° C. to prepare a self-dispersion carbon black. In addition, water was added to the resultant self-dispersion carbon black, the pH of the resultant mixture was adjusted to 10.0 with an aqueous potassium hydroxide solution, and the pigment was dispersed in such a manner that the content of the pigment is 10.0% by mass, thereby preparing a dispersion liquid. By the above-described process, was obtained Pigment Dispersion L in a state in which a carbon black in which a phthalic acid group whose counter ion was potassium was bonded to the surface of the carbon black particle was dispersed in water. Incidentally, the content of the pigment in the Pigment Dispersion L prepared above was 10.0% by mass, the pH thereof was 10.0, and the average particle size of the pigment was 120 nm. In addition, the surface charge amount of the pigment as measured by the method described above was 0.34 mmol/g.

Preparation of Pigment Dispersion M

Twenty-five grams of Black Pearls 880 (product of Cabot) having a specific surface area of 220 m$^2$/g and a solution with 24.5 mmol of sulfanilic acid dissolved in hot water were mixed, and stirring was conducted until the temperature of the solution reached 30° C. Thereafter, 64.0 mmol of concentrated hydrochloric acid was added, and a solution with 23.9 mmol of sodium nitrite dissolved in a small amount of water was added over 1 hour. After pure water was then added, and stirring was conducted, the pH of the resultant mixture was adjusted to 9.0 with an aqueous potassium hydroxide solution. Thereafter, water was evaporated in an oven until the content of the pigment reached 10. % by mass. The mixture was further filtered through a filter having a pore size of 1.2 μm to disperse the pigment in such a manner that the content of the pigment is 10.0% by mass, thereby preparing a pigment dispersion. By the above-described process, was obtained Pigment Dispersion M in a state in which a carbon black in which a sulfonic acid group was bonded to the surface of the pigment particle was dispersed in water. The surface charge amount of the self-dispersion pigment prepared above was measured by the method described above and was found to be 0.34 mmol/g. Incidentally, the pH of the Pigment Dispersion M was 10.0, and the average particle size of the pigment was 120 nm.

Preparation of Pigment Dispersion N

A reaction vessel of an automatic polymerization reaction apparatus (Polymerization Testing Machine DSL-2AS model, manufactured by Todoroki Sangyo) having the reaction vessel provided with a stirring device, a dropping device, a temperature sensor and a refluxing device having a nitrogen inlet device at an upper portion was charged with 480.0 parts of 2-propanol, and the interior of the reaction vessel was purged with nitrogen while stirring. After the reaction vessel was heated to 80° C. while retaining the interior thereof under the nitrogen atmosphere, a liquid mixture of 30.0 parts of 2-hydroxyethyl methacrylate, 166.7 parts of styrene, 204.0 parts of Phosmer PE ($CH_2$=$C(CH_3)COO(C_2H_4O)_4$—$PO_3H_2$, product of Uni-Chemical), 12.0 parts of glycidyl methacrylate, 16.0 parts of Blemmer TGL (polymerization degree modifier, product of NOF CORPORATION) and 32.0 parts of PERBUTYL O (polymerization initiator, product of NOF CORPORATION) was added dropwise over 4 hours from the dropping device. After completion of the dropping, a reaction was conducted additionally for 7 hours to obtain an acrylic polymer having an acid value of 150 mg KOH/g and a weight-average molecular weight of 11,400 and containing a phosphoric acid group.

Ten parts of a carbon black having a specific surface area of 220 m$^2$/g and a DBP oil absorption of 74 ml/100 g, 20.0 parts of the above-obtained acrylic polymer containing the phosphoric acid group and 70 parts of water were mixed. After this mixture was dispersed for 1 hour by means of a sand grinder, coarse particles were removed by centrifugation, and the thus-treated mixture was filtered under pressure through a microfilter (product of Fuji Photo Film Co., Ltd.) having a pore size of 3.0 μm. Pigment Dispersion N dispersed by the acrylic polymer containing the phosphoric acid group was obtained by the above-described process. Incidentally, the content of the pigment in the Pigment Dispersion N prepared above was 10.0% by mass, the content of the polymer was 20.0% by mass, the pH of the dispersion was 10.0, and the average particle size of the pigment was 120 nm.

Preparation of Pigment Dispersion O

Cab-O-Jet 400 (product of Cabot) marketed as a self-dispersion carbon black in which a bisphosphonic acid group was bonded to the surface of carbon black was diluted with water, and the resultant diluted product was sufficiently stirred to obtain Pigment Dispersion O. The content of the pigment in the Pigment Dispersion O was 10.0% by mass, the pH thereof was 9.0, the average particle size of the pigment was 130 nm, and the surface charge amount of the pigment was 0.19 mmol/g.

TABLE 1

Kind and property of pigment dispersion

| Pigment dispersion No. | Kind of pigment | Kind of functional group or polymer for dispersing pigment | Surface charge amount (mmol/g) |
|---|---|---|---|
| Pigment Dispersion A | PB15:3 | Bisphosphonic acid group | 0.34 |
| Pigment Dispersion B | PB15:3 | Bisphosphonic acid group | 0.25 |
| Pigment Dispersion C | PB15:3 | Bisphosphonic acid group | 0.42 |

TABLE 1-continued

Kind and property of pigment dispersion

| Pigment dispersion No. | Kind of pigment | Kind of functional group or polymer for dispersing pigment | Surface charge amount (mmol/g) |
|---|---|---|---|
| Pigment Dispersion D | PR122 | Bisphosphonic acid group | 0.34 |
| Pigment Dispersion E | CB | Bisphosphonic acid group | 0.34 |
| Pigment Dispersion F | CB | Bisphosphonic acid group | 0.25 |
| Pigment Dispersion G | CB | Bisphosphonic acid group | 0.42 |
| Pigment Dispersion H | CB | Bisphosphonic acid group | 0.24 |
| Pigment Dispersion I | PB15:3 | Bisphosphonic acid group | 0.24 |
| Pigment Dispersion J | CB | Bisphosphonic acid group | 0.43 |

TABLE 1-continued

Kind and property of pigment dispersion

| Pigment dispersion No. | Kind of pigment | Kind of functional group or polymer for dispersing pigment | Surface charge amount (mmol/g) |
|---|---|---|---|
| Pigment Dispersion K | PB15:3 | Bisphosphonic acid group | 0.43 |
| Pigment Dispersion L | CB | Phthalic acid group | 0.34 |
| Pigment Dispersion M | CB | Sulfonic acid group | 0.34 |
| Pigment Dispersion N | CB | Acrylic polymer containing phosphoric acid group | — |
| Pigment Dispersion O | CB | Bisphosphonic acid group | 0.19 |

PB15:3: C.I. Pigment Blue 15:3
PR122: C.I. Pigment Red 122
CB: Carbon black.

Preparation of Polyurethane Polymer Dispersion:

A 4-necked flask equipped with a thermometer, a stirrer, a nitrogen inlet tube and a refluxing tube was charged with a polyisocyanate (A and B parts), a polyol (C parts), a diol (D parts) having an acid group and methyl ethyl ketone (300 parts) to conduct a reaction for 6 hours at 80° C. under a nitrogen gas atmosphere. Thereafter, a chain extender (E parts) was added to conduct a reaction at 80° C. until the presence of an isocyanate group was not identified by FT-IR. After the reaction, the resultant mixture was cooled to 40° C., ion-exchanged water was added, and an aqueous potassium hydroxide solution was added while stirring at high speed by a homomixer. Methyl ethyl ketone was distilled out of the resulting polymer solution by heating under reduced pressure to obtain a polyurethane polymer dispersion in which the content of the polymer was 20.0% by mass. The acid value of each of the resultant polyurethane polymers was measured by the above-described measuring method. Preparation conditions of each polyurethane polymer dispersion and the acid value of the polyurethane polymer are shown in Table 2. Incidentally, abbreviations in Table 1 are as follows.

HMDI: Dicyclohexylmethane-4,4'-diisocyanate
IPDI: Isophorone diisocyanate
PPG: Polypropylene glycol (number-average molecular weight: 2,000)
PTMG: Polytetramethylene glycol (number-average molecular weight: 2,000)
PES: Polyester polyol (number-average molecular weight: 2,000)
DMPA: Dimethylolpropionic acid
EDA: Ethylenediamine.

TABLE 2

Preparation conditions and property of polyurethane polymer dispersion

| Polyurethane polymer dispersion No. | Polyisocyanate | | | | Polyol | | Diol having an acid group | | Chain extender | | Property |
|---|---|---|---|---|---|---|---|---|---|---|---|
| | Kind | A (parts) | Kind | B (parts) | Kind | C (parts) | Kind | D (parts) | Kind | E (parts) | Acid value (mg KOH/g) |
| PU-1 | HMDI | 100.4 | — | — | PPG | 54.5 | DMPA | 43.0 | EDA | 2.1 | 0 |
| PU-2 | HMDI | 100.4 | — | — | PTMG | 54.5 | DMPA | 43.0 | EDA | 2.1 | 0 |
| PU-3 | HMDI | 100.4 | — | — | PEG | 54.5 | DMPA | 43.0 | EDA | 2.1 | 0 |
| PU-4 | HMDI | 84.3 | IPDI | 8.6 | PPG | 62.1 | DMPA | 43.0 | EDA | 2.1 | 10 |
| PU-5 | IPDI | 86.6 | — | — | PPG | 68.3 | DMPA | 43.0 | EDA | 2.1 | 100 |

Preparation of Ink:

The above-obtained pigment dispersions and polyurethane polymer dispersions were mixed with the following respective components in the combinations shown in Table 3. Incidentally, "Balance" of ion-exchanged water means such an amount that the total amount of all the components constituting an ink amounts to 100.0% by mass.

| | |
|---|---|
| Pigment dispersion (pigment content: 10.0% by mass) | 30.0% by mass |
| Polyurethane polymer dispersion (polymer content: 20.0% by mass) | 5.0% by mass |
| Glycerol | 9.0% by mass |
| Diethylene glycol | 5.0% by mass |
| Triethylene glycol | 5.0% by mass |
| Compounds represented by the following general formulae (1) to (3) | see Table 3 |
| Acetylenol E100 (surfactant, product of Kawaken Fine Chemicals Co., Ltd.) | 0.2% by mass |
| Ion-exchanged water | Balance. |

After these respective components were sufficiently stirred and dispersed, the resultant dispersion liquids were filtered under pressure through a microfilter (product of Fuji Photo Film Co., Ltd.) having a pore size of 3.0 μm to prepare respective inks.

TABLE 3

Preparation conditions of ink

| Ink No. | Pigment dispersion N0. | Polyurethane (PU) polymer dispersion No. | Compounds represented by general formulae (1) to (3) | | | Content of compounds represented by general formulae (1) to (3)/ content of PU polymer (times) |
|---|---|---|---|---|---|---|
| | | | 2-Pyrrolidone | N-Methyl-2-pyrrolidone | 1,2-Hexanediol | |
| Ink 1 | A | PU-1 | 0 | 0 | 0 | 0 |
| Ink 2 | B | PU-1 | 0 | 0 | 0 | 0 |
| Ink 3 | C | PU-1 | 0 | 0 | 0 | 0 |
| Ink 4 | D | PU-1 | 0 | 0 | 0 | 0 |
| Ink 5 | A | PU-2 | 0 | 0 | 0 | 0 |
| Ink 6 | A | PU-3 | 0 | 0 | 0 | 0 |
| Ink 7 | E | PU-1 | 0 | 0 | 0 | 0 |
| Ink 8 | F | PU-1 | 0 | 0 | 0 | 0 |
| Ink 9 | G | PU-1 | 0 | 0 | 0 | 0 |
| Ink 10 | E | PU-1 | 1.9 | 0 | 0 | 1.9 |
| Ink 11 | E | PU-1 | 0 | 1.9 | 0 | 1.9 |
| Ink 12 | E | PU-1 | 0 | 0 | 1.9 | 1.9 |
| Ink 13 | E | PU-1 | 0.9 | 0.9 | 0 | 1.8 |
| Ink 14 | E | PU-1 | 0.9 | 0 | 0.9 | 1.8 |
| Ink 15 | E | PU-1 | 0 | 0.9 | 0.9 | 1.8 |
| Ink 16 | E | PU-1 | 0.6 | 0.6 | 0.6 | 1.8 |
| Ink 17 | E | PU-1 | 2.0 | 0 | 0 | 2.0 |
| Ink 18 | E | PU-1 | 0 | 2.0 | 0 | 2.0 |
| Ink 19 | E | PU-1 | 0 | 0 | 2.0 | 2.0 |
| Ink 20 | E | PU-1 | 10.0 | 0 | 0 | 10.0 |
| Ink 21 | E | PU-4 | 2.0 | 0 | 0 | 2.0 |
| Ink 22 | E | PU-5 | 2.0 | 0 | 0 | 2.0 |
| Ink 23 | F | PU-4 | 2.0 | 0 | 0 | 2.0 |
| Ink 24 | G | PU-4 | 2.0 | 0 | 0 | 2.0 |
| Ink 25 | H | PU-4 | 2.0 | 0 | 0 | 2.0 |
| Ink 26 | I | PU-4 | 2.0 | 0 | 0 | 2.0 |
| Ink 27 | J | PU-4 | 2.0 | 0 | 0 | 2.0 |
| Ink 28 | K | PU-4 | 2.0 | 0 | 0 | 2.0 |
| Ink 29 | L | PU-4 | 2.0 | 0 | 0 | 2.0 |
| Ink 30 | M | PU-4 | 2.0 | 0 | 0 | 2.0 |
| Ink 31 | N | PU-4 | 2.0 | 0 | 0 | 2.0 |
| Ink 32 | O | PU-4 | 2.0 | 0 | 0 | 2.0 |

Evaluation:

In the present invention, in the evaluation criteria of the following respective evaluation items, AA to B were regarded as a favorable level, and C and D were regarded as an unacceptable level. Incidentally, each of the following evaluations were made by using an ink jet recording apparatus PIXUS iP3100 (manufactured by Canon Inc.). Recording was conducted under the conditions of a temperature of 23° C., a relative humidity of 55% and an ejection amount per drop of 28 ng (within ±10%). In the ink jet recording apparatus, an image recorded under the conditions that resolution is 600 dpi×600 dpi and about 28 ng of an ink droplet is applied to a unit region of 1/600 inch×1/600 inch is defined as a recording duty of 100%.

Fastness of Image Upon Long-Term Storage

Each ink obtained above was charged into an ink cartridge, and the ink cartridge was installed in the ink jet recording apparatus. A vertical ruled line having a line thickness of 1/10 inch was then recorded on PPC paper GF-500 (product of Canon Inc.). After 5 minutes from the recording, the resultant vertical ruled line was marked with a yellow highlighter OPTEX 2 (product of ZEBRA) to regard the marked image as an image subjected to the marking test before storage. Each ink obtained above was then stored under condition 1 (for 7 days at 60° C.) and condition 2 (for 14 days at 60° C.), and a marking test was conducted in the same manner as described above to obtain an image subjected to the marking test after storage. As to the respective storage conditions of the ink, the images subjected to the marking test before and after the long-term storage were visually observed, thereby making evaluation as to change in the fastness of the image upon the long-term storage of the ink. The evaluation criteria are as follows. Evaluation results are shown in Table 4.

AA: No change was observed in the stain of the marked portions of the images subjected to the marking test before and after the storage;

A: Slight change was observed in the stain of the marked portions of the images subjected to the marking test before and after the storage;

B: Change was observed in the stain of the marked portions of the images subjected to the marking test before and after the storage, but it was an inconspicuous level;

C: The marked portion of the image subjected to the marking test after the storage was obviously stained compared with the image before the storage;

D: The marked portion of the image subjected to the marking test after the storage was markedly stained compared with the image before the storage.

Dispersion Stability of Pigment Upon Long-Term Storage

With respect to each ink obtained above, the particle size $d_1$ of the pigment in the ink was measured. the particle size of the pigment was measured by means of a concentrated system particle size analyzer FPAR-1000 (manufactured by OTSUKA ELECTRONICS CO., LTD.). Thereafter, each ink was stored for a long period of time under conditions of 80° C. and 10 days. After the temperature of the ink was returned to the temperature before the long-term storage, the particle size $d_2$ of the pigment in the ink was measured in the same manner as described above. A value (D (%)=$(d_2-d_1)/d_1 \times 100$) was determined from the particle sizes of the pigment before and after the long-term storage to evaluate the ink as to the dispersion stability of the pigment upon the long-term storage according to the following evaluation criteria. Incidentally, the smaller the D value, the higher the dispersion stability of the pigment upon the long-term storage. Evaluation results are shown in Table 4.

AA: The particle size of the pigment did not vary before and after the long-term storage;
A: The D value was less than 3%;
B: The D value was 3% or more and less than 5%;
C: The D value was 5% or more and less than 10%;
D: The D value was 10% or more.

TABLE 4

| | | Evaluation results | | |
|---|---|---|---|---|
| | | Change in fastness of image upon long-term storage of ink | | Dispersion stability of pigment upon |
| Example No. | Ink No. | Condition 1 | Condition 2 | long-term storage |
| Ex. 1 | Ink 1 | B | B | B |
| Ex. 2 | Ink 2 | B | B | B |
| Ex. 3 | Ink 3 | B | B | B |
| Ex. 4 | Ink 4 | B | B | B |
| Ex. 5 | Ink 5 | B | B | B |
| Ex. 6 | Ink 6 | B | B | B |
| Ex. 7 | Ink 7 | A | B | A |
| Ex. 8 | Ink 8 | A | B | A |
| Ex. 9 | Ink 9 | A | B | A |
| Ex. 10 | Ink 10 | A | A | A |
| Ex. 11 | Ink 11 | A | A | A |
| Ex. 12 | Ink 12 | A | A | A |
| Ex. 13 | Ink 13 | A | A | A |
| Ex. 14 | Ink 14 | A | A | A |
| Ex. 15 | Ink 15 | A | A | A |
| Ex. 16 | Ink 16 | A | A | A |
| Ex. 17 | Ink 17 | AA | A | AA |
| Ex. 18 | Ink 18 | AA | A | AA |
| Ex. 19 | Ink 19 | AA | A | AA |
| Ex. 20 | Ink 20 | AA | A | AA |
| Ex. 21 | Ink 21 | AA | AA | AA |
| Ex. 22 | Ink 22 | AA | AA | AA |
| Ex. 23 | Ink 23 | AA | AA | AA |
| Ex. 24 | Ink 24 | AA | AA | AA |
| Comp. Ex 1 | Ink 25 | AA | AA | C |
| Comp. Ex 2 | Ink 26 | AA | AA | C |
| Comp. Ex 3 | Ink 27 | C | C | AA |
| Comp. Ex 4 | Ink 28 | C | C | AA |
| Comp. Ex 5 | Ink 29 | C | C | AA |
| Comp. Ex 6 | Ink 30 | C | C | AA |
| Comp. Ex 7 | Ink 31 | C | D | AA |
| Comp. Ex 8 | Ink 32 | AA | AA | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107780, filed May 9, 2012, which is hereby incorporated by reference herein in its entirety.

What is claimed is:

1. An ink comprising:
   a self-dispersion pigment in which a phosphonic acid group is bonded directly or through another atomic group to the surface thereof;
   a polyurethane polymer; and
   at least one compound selected from the group consisting of 2-imidazolidinone, 1,3-dimethyl-2-imidazolidinone, 2-pyrrolidone, N-methyl-2-pyrrolidone, and 1,2-alkanediol,
   wherein a surface charge amount of the self-dispersion pigment is from 0.25 mmol/g to 0.42 mmol/g,
   wherein the polyurethane polymer has units respectively derived from a polyisocyanate, a polyether polyol having no acid group, and a diol having an acid group, and
   wherein the mass ratio of (a) the content (% by mass) of the at least one compound based on the total mass of the ink and (b) the content (% by mass) of the polyurethane polymer based on the total mass of the ink is 2.0 times or more.

2. The ink according to claim 1, wherein the pigment is a carbon black.

3. The ink according to claim 1, wherein the polyisocyanate includes isophoronediisocyanate.

4. An ink cartridge comprising an ink storage portion storing an ink, wherein the ink stored in the ink storage portion is the ink according to claim 1.

5. An ink jet recording method comprising ejecting an ink from a recording head by an action of thermal energy, wherein the ink is the ink according to claim 1.

6. The ink according to claim 1, wherein the mass ratio of (a) the content (% by mass) of the at least one compound based on the total mass of the ink and (b) the content (% by mass) of the polyurethane polymer based on the total mass of the ink is from 2.0 to 10.0 times.

7. The ink according to claim 1, wherein the polyisocyanate is selected from the group consisting of tetramethylenediisocyanate, dodecamethylenediisocyanate, hexamethylenediisocyanate, 2,2,4-trimethylhexamethylenediisocyanate, 2,4,4-trimethylhexamethylenediisocyanate, lysinediisocyanate, 2-methylpentane-1,5-diisocyanate, and 3-methylpentane-1,5-diisocyanate.

8. The ink according to claim 1, wherein the polyisocyanate is selected from the group consisting of tolylenediisocyanate, 2,2'-diphenylmethanediisocyanate, 2,4'-diphenylmethane-diisocyanate, 4,4'-diphenylmethanediisocyanate, 4,4'-dibenzyldiisocyanate, 1,5-naphthylenediisocyanate, xylylenediisocyanate, 1,3-phenylenediisocyanate, and 1,4-phenylenediisocyanate.

9. The ink according to claim 1, wherein the polyisocyanate is selected from the group consisting of dialkyldiphenylmethanediisocyanates, tetraalkyldiphenylmethanediisocyanates, and α,α,α,α-tetramethylxylylenediisocyanate.

10. The ink according to claim 1, wherein the proportion (% by mass) of the unit derived from the polyether polyol having no acid group in the polyurethane polymer is from 0.1% by mass to 80.0% by mass.

11. The ink according to claim 1, wherein the polyether polyol having no acid group is selected from the group consisting of polyethylene glycol, polypropylene glycol, poly(1,2-butylene glycol), and poly(1,3-butylene glycol).

12. The ink according to claim 1, wherein the diol having the acid group is selected from the group consisting of dimethylolpropionic acid and dimethylol-butanoic acid.

13. The ink according to claim 1, wherein the acid value of the polyurethane polymer based on the unit derived from the diol having the acid group is from 40 mg KOH/g to 140 mg KOH/g.

14. The ink according to claim 1, wherein the content (% by mass) of the polyurethane polymer is from 0.1% by mass to 10.0% by mass based on the total mass of the ink.

15. The ink according to claim 1, wherein the content (% by mass) of the pigment is from 0.1% by mass to 15.0% by mass based on the total mass of the ink.

16. The ink according to claim 1, wherein the pigment comprises an atomic group to which a bisphosphonic acid group is bonded to the surface thereof.

17. The ink according to claim 1, wherein a volume average particle size of the pigment is from 50 nm to 150 nm.

18. The ink according to claim 6, wherein (a) the pigment is a carbon black, (b) the polyurethane polymer includes polyisocyanate, polypropylene glycol, and dimethylol propionic acid, and (c) the at least one compound is 2-pyrrolidone.

19. The ink according to claim 6, wherein (a) the pigment is a carbon black, (b) the polyurethane polymer includes polyisocyanate, polypropylene glycol, and dimethylol propionic acid, and (c) the at least one compound is N-methyl-2-pyrrolidone.

* * * * *